United States Patent [19]

Matsuda et al.

[11] Patent Number: 5,367,461
[45] Date of Patent: Nov. 22, 1994

[54] VARIABLY SENSITIVE TRACTION CONTROL METHOD FOR VEHICLE

[75] Inventors: Shohei Matsuda; Toshio Yahagi, both of Saitama, Japan

[73] Assignee: Honda Giken Kogyo Kabushiki Kaisha, Tokyo, Japan

[21] Appl. No.: 32,544

[22] Filed: Mar. 17, 1993

Related U.S. Application Data

[63] Continuation of Ser. No. 592,732, Oct. 4, 1990, abandoned.

[30] Foreign Application Priority Data

Oct. 5, 1989 [JP] Japan .................................. 1-260862

[51] Int. Cl.$^5$ ............................................... B60T 8/32
[52] U.S. Cl. ............................ 364/426.02; 180/197
[58] Field of Search ................... 364/426.01, 426.02, 364/426.04, 426.03; 180/197

[56] References Cited

U.S. PATENT DOCUMENTS

| | | | |
|---|---|---|---|
| 4,745,552 | 5/1988 | Phelps et al. | 364/426.03 |
| 4,763,912 | 8/1988 | Matsuda | 180/197 |
| 4,770,266 | 9/1988 | Yamaguchi et al. | 180/197 |
| 4,771,850 | 9/1988 | Matsuda | 180/197 |
| 4,778,025 | 10/1988 | Sakaguchi et al. | 180/197 |
| 4,792,011 | 12/1988 | Stelter et al. | 180/197 X |
| 4,835,695 | 5/1989 | Walenty et al. | 364/426.02 |
| 4,864,504 | 9/1989 | Koshizawa et al. | 364/426.02 |
| 4,953,093 | 8/1990 | Etoh | 364/426.03 X |
| 4,955,448 | 9/1990 | Ise et al. | 180/197 |
| 4,991,910 | 2/1991 | Shimanuki et al. | 364/426.02 X |

FOREIGN PATENT DOCUMENTS 1292769 10/1972 United Kingdom .
2020382 11/1979 United Kingdom .

*Primary Examiner*—Vincent N. Trans
*Attorney, Agent, or Firm*—Armstrong, Westerman, Hattori, McLeland & Naughton

[57] ABSTRACT

A method for traction control of a vehicle, includes the steps of detecting a slipping tendency of a driving wheel in a driving state and controlling a suppression of driving torque of the driving wheel in accordance with the slipping tendency of the driving wheel, such that, when the vehicle is being reduced in speed, the control of the suppression of driving torque has a reduced control sensitivity. Further, the reduced control sensitivity may actually inhibit the suppression of driving torque.

12 Claims, 2 Drawing Sheets

VARIABLY SENSITIVE TRACTION CONTROL METHOD FOR VEHICLE

This application is a continuation of application Ser. No. 07/592,732 filed Oct. 4, 1990, now abandoned.

BACKGROUND OF THE INVENTION

1. Field of the Invention

The present invention-relates to a traction control method for a vehicle, comprising detecting the slipping tendency of a driving wheel in a driving state and controlling the driving torque to suppress it in accordance with the slipping tendency of the driving wheel.

2. Description of the Related Art

Such traction control method is conventionally known, for example, in Japanese Patent Application Laid-open No. 265061/87 or the like.

In the above conventional method, the slipping tendency of the driving wheel is determined by comparison of a driving wheel speed with a reference speed based on a vehicle speed and when the slipping tendency increases, the driving torque is suppressed, thereby eliminating the excessive slipping produced in the driving wheel in order to recover driving force. When the vehicle is being reduced in speed, the driving-torque suppressing control is unnecessary. In the above conventional method, however, a disadvantage occurs in that it may be determined that the slipping tendency of the driving wheel is increased when the accelerator pedal is depressed while the brake pedal is being depressed, and on the basis of such decision, the traction control may be executed, thereby bringing about reductions in the increase of speed and in braking performnce.

SUMMARY OF THE INVENTION

The present invention has been accomplished in view of the above disadvantages in the conventional method. It is an object of the present invention to provide a traction control method for a vehicle, wherein the excessive suppression of the driving torque during reduction in speed of the vehicle is avoided in order to prevent reductions in increase of speed and in braking performance.

According to a first aspect of the present invention, when the vehicle is reducing its speed, the driving-torque suppression control is inhibited.

According to a second aspect of the present invention, it is decided that the vehicle is reducing its speed, by a signal produced from a brake switch which detects a braking operation.

According to a third respect of the present invention, the inhibition of the driving-torque suppression control is removed when the travel speed of the vehicle is lower than a predetermined value.

According to a fourth aspect of the present invention, the inhibition of the driving-torque suppression control is removed when a signal indicative of the brake being operative from before starting of the traction control is produced from the brake switch.

According to a fifth aspect of the present invention, it is decided whether or not the vehicle is being reduced in speed by a comparison of vehicle speed presumed on the basis of a last detected driven wheel speed with a presently detected driven wheel speed.

According to a sixth aspect of the present invention, the driving-torque suppression control is inhibited when a parking brake is operative.

According to the first aspect, the suppression control is reduced during reduction in speed of the vehicle and, therefore, the execution of an unnecessary driving-torque suppression control is avoided.

According to the first aspect of the present invention, when the vehicle is being reduced in speed, the driving-force suppression control is inhibited. Therefore, the execution of an unnecessary driving-torque suppression control can be avoided to prevent reductions in driving and braking performance.

According to the second aspect, when it can be decided that the vehicle is reducing its speed during braking and therefore, the execution of an unnecessary driving-torque suppression control is avoided.

According to the second aspect of the present invention, it is decided that the vehicle is being reduced in speed, by the signal produced from the brake switch which detects the depression of the brake pedal. Therefore, the execution of an unnecessary driving-torque suppression control is avoided.

According to the third aspect, the inhibition of the driving-torque suppression control is removed when the travel speed of the vehicle is lower than the predetermined value. This is effective when an operator of the vehicle concurrently depresses both the accelerator pedal and the brake pedal when the vehicle speed is low at the start of travelling, for example. In such case, the recovery of the driving force is provided by the execution of the driving-torque suppression control according to the slipping tendency of the driving wheel.

According to the third aspect of the present invention, the inhibition of the driving-torque suppression control is removed when the travel speed of the vehicle is lower than a predetermined value. Therefore, the recovery of the driving force is provided by execution of the driving-torque suppression control according to the slipping tendency of the driving wheel, when the operator of the vehicle concurrently depresses both of the accelerator pedal and the brake pedal when the vehicle speed is low at the start of travelling, for example.

According to the fourth aspect, the inhibition of control is removed when the driving-torque suppression control is executed after the braking operation is conducted. In such a case, when the slipping tendency of the driving wheel is increased as a result of depression of the accelerator pedal, after the braking operation when the travel speed of the vehicle is lower than the predetermined value, the normal traction control is executed to provide the recovery of the driving force.

According to the fourth aspect of the present invention, the inhibition of the driving-torque suppression control is prohibited when a signal indicative of the brake being operative from before starting of the traction control is produced from the brake switch. Therefore, when the slipping tendency is increased as a result of depression of the accelerator pedal after the braking operation is conducted when the travel speed of the vehicle is lower than the predetermined value, the normal traction control can be executed to provide the recovery of the driving force.

According to the fifth aspect, it is possible to easily decide whether or not the vehicle is reducing its speed.

According to the fifth aspect of the present invention, it is decided whether or not the vehicle is being reduced in speed by comparison of a vehicle speed presumed on the basis of a previous driven wheel speed with a present driven wheel speed. Therefore, it is possible to easily decide whether or not the vehicle is being reduced in speed.

Further, according to the sixth aspect, the driving-torque suppression control is inhibited when the parking brake is operative, because when the vehicle is travelling with the parking brake operative, the driven wheel is in a dragging state and hence, it is difficult to accurately presume the vehicle speed, and it is undesirable to decide the slipping tendency of the driving wheel on the basis of an inaccurate vehicle speed.

According to the sixth aspect of the present invention, the driving-torque suppression control is inhibited when the parking brake is operative. Therefore, it is possible to inhibit the driving-torque suppression control to prevent the traction control from being inadvertently executed, in consideration of the fact that it is difficult to accurately presume the vehicle speed when the parking brake is operative with the driven wheel being in a dragging state.

DETAILED DESCRIPTION OF THE PREFERRED EMBODIMENT

Figure 1:
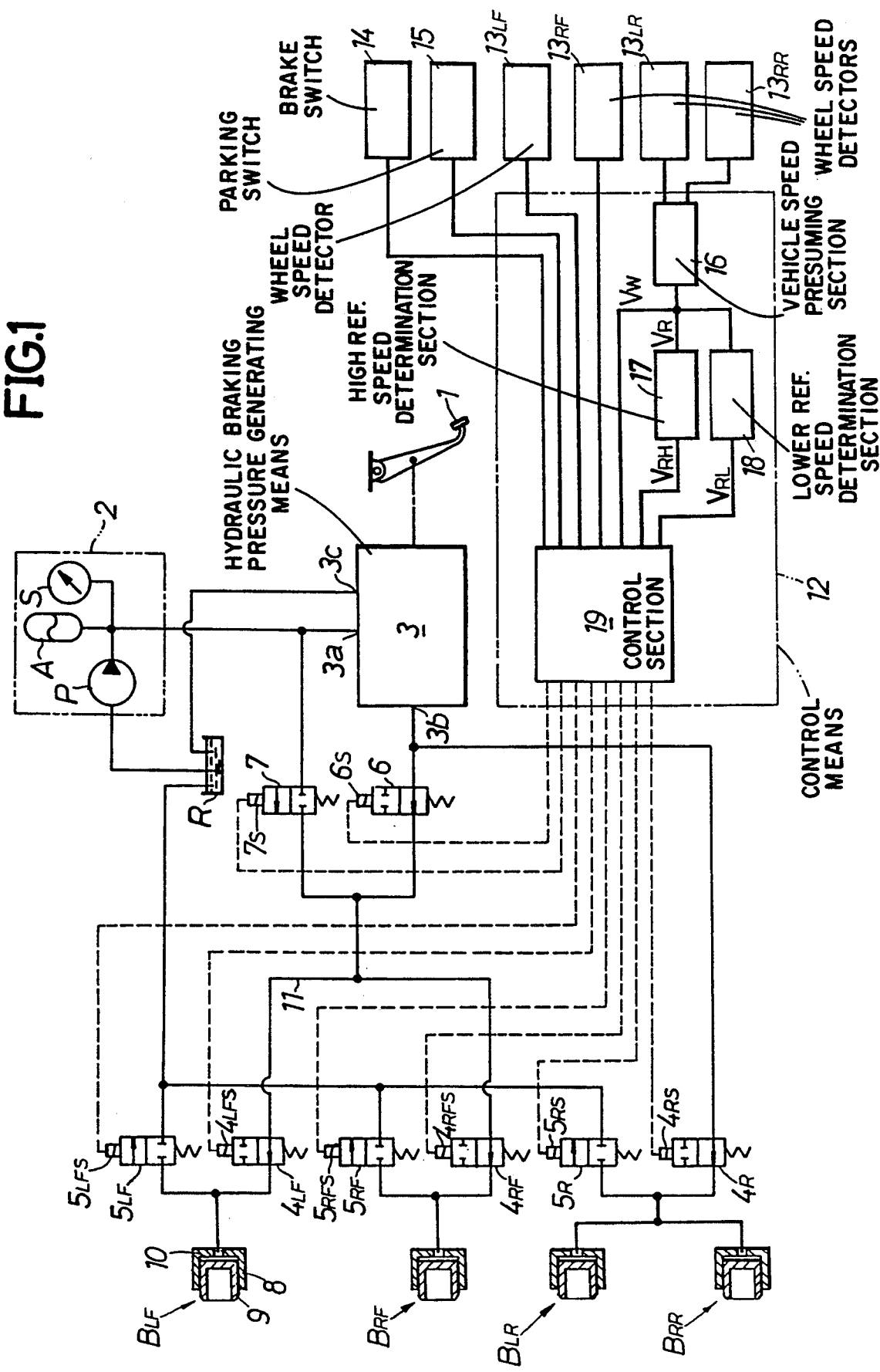
FIG. 1 is a schematic diagram of a traction control system in accordance with the instant invention.

The present invention will now be described with reference to the accompanying drawings in connection with an embodiment in which the present invention is applied to a front engine and front drive vehicle. Referring first to FIG. 1, a left driving wheel brake device $B_{LF}$ and a right driving wheel brake device $B_{RF}$ are mounted on left and right front wheels of the vehicle, respectively, and a left driven wheel brake device $B_{LR}$ and a right driven wheel brake device $B_{RR}$ are mounted on left and right rear wheels, respectively. A hydraulic braking force generating means 3 is connected to a brake pedal 1 and capable of controlling the hydraulic pressure from a hydraulic pressure supply source 2 in accordance with the amount brake pedal 1 is depressed in order to produce a controlled hydraulic pressure. During normal braking, the hydraulic pressure produced by the hydraulic braking pressure generating means 3 is applied to each of the brake devices $B_{LF}$, $B_{RF}$, $B_{LR}$ and $B_{RR}$. The hydraulic braking pressure of the brake devices $B_{LF}$, $B_{RF}$, $B_{LR}$ and $B_{RR}$ can be maintained or reduced to effect an anti-lock control through inlet solenoid valves $4_{LF}$ and $4_{RF}$ and outlet solenoid valves $5_{LF}$ and $5_{RF}$ mounted in independent association with the driving wheel brake devices $B_{LF}$ and $B_{RF}$ and an inlet solenoid valve $4_R$ and an outlet solenoid valve $5_R$ which are commonly associated with the driven wheel brake devices $B_{LR}$ and $B_{RR}$. In addition, the hydraulic braking pressure of the driving wheel brake devices $B_{LF}$ and $B_{RF}$ can be increased to effect a traction control through a traction-controlling normally-opened solenoid valve 6 and normally-closed solenoid valve 7 as well as the inlet solenoid valves $4_{LF}$ and $4_{RF}$ and the outlet solenoid valves $5_{LF}$ and $5_{RF}$.

The hydraulic pressure supply source 2 comprises a hydraulic pump P for pumping working oil from a reservoir R, an accumulator A connected to the hydraulic pump P, and a pressure switch S for controlling the operation of the hydraulic pump P.

The hydraulic braking pressure generating means 3 has an input port $3a$ and an output port $3b$ leading to the hydraulic pressure supply source 2, and a release port $3c$ leading to the reservoir R, and is constructed so that hydraulic pressure according to the amount brake pedal 1 is depressed may be delivered from the output port $3b$ by switch-over of a communication between the output port $3b$ and the input port $3a$ and a communication between the output port $3b$ and the release port $3c$ in response to the depression of the brake pedal 1.

Each of the brake device $B_{LF}$, $B_{RF}$, $B_{LR}$ and $B_{RR}$ comprises a cylinder 8 and a braking piston 9 slidably received in the cylinder 8, and is constructed to exhibit a braking force by movement of the braking piston 9 according to the hydraulic pressure applied to a hydraulic braking pressure chamber 10 defined between the cylinder 8 and the piston 9.

The solenoid valves $4_{LF}$ and $5_{LF}$ are connected in parallel to hydraulic chamber 10 of drive wheel brake device $B_{LF}$. Solenoid valves $4_{RF}$ and $5_{RF}$ are connected in parallel to hydraulic braking pressure chamber 10 in the drive wheel brake device $B_{RF}$. The inlet solenoid valve $4_R$ and the outlet solenoid valve $5_R$ are connected in parallel to the driven wheel brake devices $B_{LR}$ and $B_{RR}$. The inlet solenoid valves $4_{LF}$, $4_{RF}$ and $4_R$ are normally-opened solenoid valves which are closed during excitation of solenoids $4_{LFS}$, $4_{RFS}$ and $4_{RS}$, and the outlet solenoid valves $5_{LF}$, $5_{RF}$ and $5_R$ are normally-closed solenoid valves which are opened during excitation of solenoids $5_{LFS}$, $5_{RFS}$ and $5_{RS}$. Moreover, the inlet solenoid valves $4_{LF}$ and $4_{RF}$ are interposed between the hydraulic braking pressure chambers 10 in the drive wheel brake devices $B_{LF}$ and $B_{RF}$ and an oil passage 11, and the outlet solenoid valves $5_{LF}$ and $5_{RF}$ are interposed between the hydraulic braking pressure chambers 10 in the drive wheel brake devices $B_{LF}$ and $B_{RF}$ and the reservoir R. The inlet solenoid valve $4_R$ is interposed between the hydraulic braking pressure chambers 10 in the driven wheel brake devices $B_{LR}$ and $B_{RR}$ and the output port $3b$ of the hydraulic braking pressure generating means 3, and the outlet solenoid valve $5_R$ is interposed between the hydraulic braking pressure chambers 10 in the driven wheel brake devices $B_{LR}$ and $B_{RR}$ and the reservoir R.

The traction-controlling normally-opened type solenoid valve 6 is interposed between the oil passage 11 and the output port $3b$ of the hydraulic braking pressure generating means 3, and the traction-controlling normally-closed type solenoid valve 7 is interposed between the oil passage 11 and the hydraulic pressure supply source 2.

The energization and deenergization of the solenoids $4_{LFS}$, $R_{RFS}$, $4_{RS}$, $5_{LFS}$, $5_{RFS}$, $5_{RS}$, $6_S$ and $7_S$ in the solenoid valves $4_{LF}$, $4_{RF}$, $4_R$, $5_{LF}$, $5_{RF}$, $5_R$, 6 and 7 are controlled by a control means 12, and in a normal condition, the solenoid $4_{LFS}$, $4_{RFS}$, $4_{RS}$, $5_{LFS}$, $5_{RFS}$, $5_{RS}$, $6_S$ and $7_S$ are in their deenergization states. In an anti-lock brake control during braking, the inlet solenoid valve $R_{LF}$, $4_{RF}$, $4_R$ corresponding to a wheel which is about to be locked is brought into a closed state, thereby suppressing the increasing of the braking force to avoid the wheel becoming locked, but when the wheel is still about to be brought into its locked state, the corresponding outlet solenoid valve $5_{LF}$, $5_{RF}$ and $5_R$ becoming a communication state to provide a reduction in braking force, thereby eliminating the locking tendency of the wheel.

When the driving wheel is about to begin to slip excessively, the energization and deenergization of the solenoids $6_S$ and $7_S$ of the traction-controlling normally-opened solenoid valve 6 and normally-closed solenoid valve 7 as well as the solenoids $4_{LFS}$ and $4_{RFS}$ in the inlet solenoid valves $4_{LF}$ and $4_{RF}$ and the solenoids $5_{LFS}$ and $5_{RFS}$ in the outlet solenoid valves $5_{LF}$ and $5_{RF}$ are controlled in a switchover manner by the control means 12, thereby controlling the braking force of the left and right front wheel brake devices $B_{LF}$ and $B_{RF}$, i.e., the driving torque in a suppressing manner.

When the solenoids $6_S$ and $7_S$ are energized, with the solenoids $4_{LFS}$, $4_{RFS}$, $5_{LFS}$ and $5_{RFS}$ kept deenergized, to close the normally-opened solenoid valve 6 and to open the normally-closed solenoid valve 7, the hydraulic pressure from the hydraulic pressure supply source 2 is applied to the braking hydraulic pressure chambers 10 in the driving wheel brake devices $B_{LF}$ and $B_{RF}$ to increase the braking force. When the solenoids $4_{LFS}$ and $4_{RFS}$ are energized and the solenoids $5_{LFS}$ and $5_{RFS}$ are deenergized to close the inlet solenoid valves $4_{LF}$ and $4_{RF}$ and the outlet solenoid valves $5_{LF}$ and $5_{RF}$ with the normally-opened solenoid valve 6 closed and the normally closed solenoid valve 7 opened, the hydraulic pressure in the hydraulic braking pressure chamber 10 is maintained to keep the braking force from each of the brake devices $B_{LF}$ and $B_{RF}$. Further, when the solenoids $4_{LFS}$ and $R_{RFS}$ are energized to close the inlet solenoid valves $4_{LF}$ and $4_{RF}$ and the solenoids $5_{LFS}$, $5_{RFS}$ are energized to open the outlet solenoid valves $5_{LF}$ and $5_{RF}$ with the normally-opened solenoid valve 6 closed and the normally-closed solenoid valve 7 opened, the hydraulic pressure in the hydraulic braking pressure chamber 10 can be released to decrease the braking force from each of the brake devices $B_{LF}$ and $B_{RF}$.

Connected to the control means 12 are wheel speed detectors $13_{LF}$ and $13_{RF}$ for detecting the wheel speeds of the left and right driving wheels, i.e., left and right front wheels, wheel speed detectors $13_{LR}$ and $13_{RR}$ for detecting the wheel speeds of the left and right driven wheels, i.e., left and right rear wheels, a brake switch 14 which produces a high level signal upon braking, and a parking switch 15 which produces a high level signal upon operation of a parking brake. The control means 12 controls, in a switchover manner, the energization and deenergization of the solenoids $4_{LFS}$ and $4_{RFS}$ of the inlet solenoid valves $4_{LF}$ and $R_{RF}$ and the solenoids $5_{LFS}$ and $5_{RFS}$ of the outlet solenoid valves $5_{LF}$ and $5_{RF}$ associated with the left and right driving wheel brakes $B_{LF}$ and $B_{RF}$ as well as the solenoid $6_S$ of the traction-controlling normally-opened type solenoid valve 6 and the solenoid $7_S$ of the traction-controlling normally-closed type solenoid valve 7 by values detected by the wheel speed detectors $13_{LF}$, $13_{RF}$, $13_{LR}$ and $13_{RR}$ as well as signals produced from the brake switch 14 and the parking switch 15.

The control means 12 comprises a vehicle speed presuming section 16 for presuming the vehicle speed $V_R$ from the values detected by the wheel speed detectors $13_{LR}$ and $13_{RR}$, i.e., the driven wheel speeds, a higher reference speed determination section 17 for determining a higher reference speed $V_{RH}$ on the basis of the vehicle speed $V_R$ obtained in the vehicle speed presuming section 16, a lower reference speed determination section 18 for determining a lower reference speed $V_{LR}$ on the basis of the vehicle speed $V_R$, and a control section 19 for controlling, in a switchover manner, the energization and deenergization of the solenoids $4_{LFS}$, $4_{RFS}$, $4_{RS}$, $5_{LFS}$, $5_{RFS}$, $5_{RS}$, $6_S$ and $7_S$ during a traction control and the energization and deenergization of the solenoids $4_{LFS}$, $4_{RFS}$, $4_{RS}$, $5_{LFS}$, $5_{RFS}$ and $5_{RS}$ during an anti-lock control.

The higher reference speed determination section 17 determines the higher reference speed $V_{RH}$ from the vehicle speed $V_R$ on the basis of the decision that the driving wheel is in an excessive slipping state, and the lower reference speed determination section 18 determines the lower reference speed $V_{RL}$ from the vehicle speed $V_R$ in accordance with the acceptable slip rate of the driving wheel.

Figure 2:
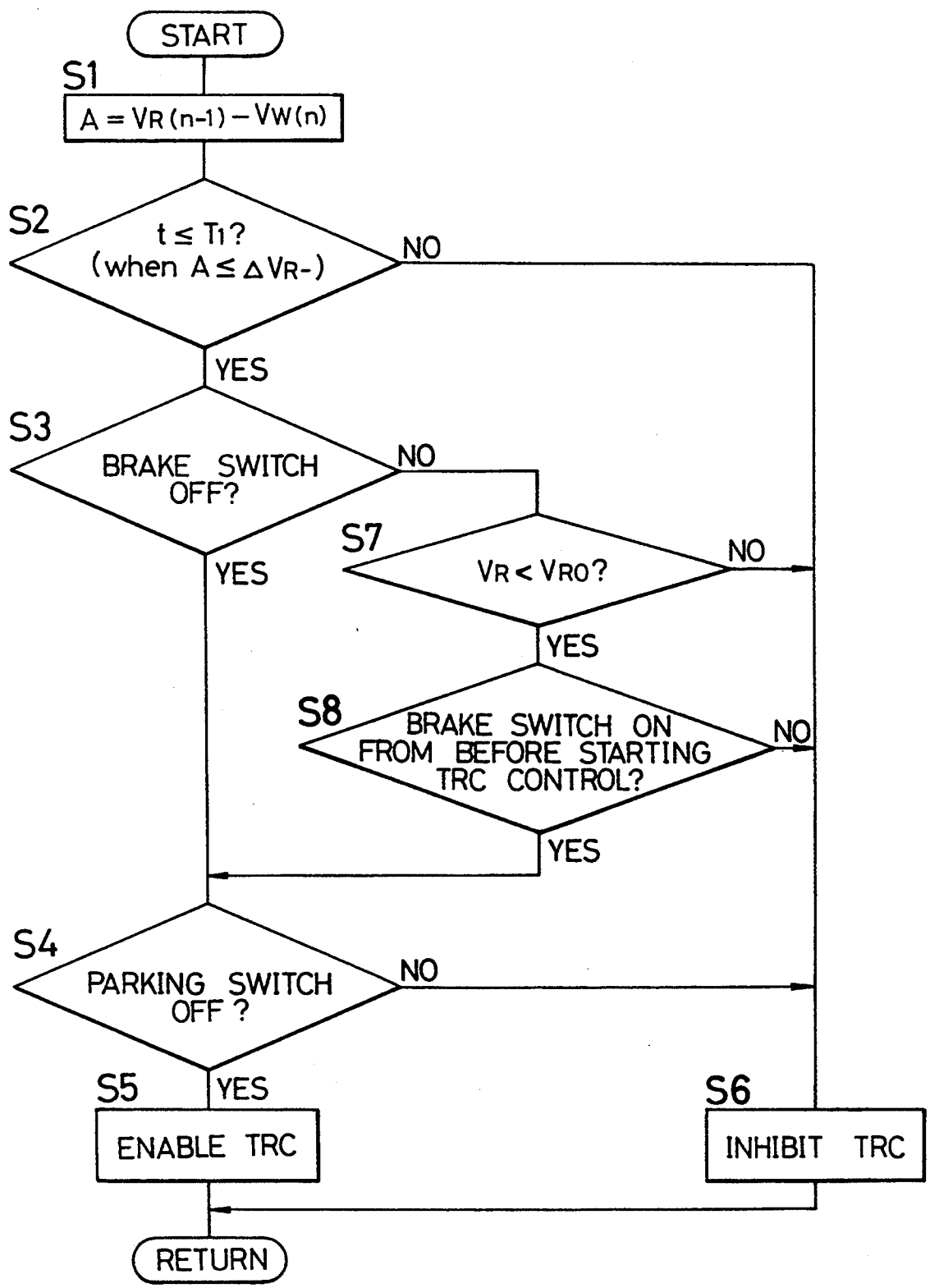
FIG. 2 is a flow chart illustrating a process for deciding whether or not to inhibit traction control.

The control section 19 decides the slipping tendency of the driving wheel by comparison of the value detected by the wheel speed detectors $13_{LF}$ and $13_{RF}$, i.e., the driving wheel speeds with the reference speeds $V_{RH}$ and $V_{RL}$ and decides the speed-increased and reduced states of the vehicle from the vehicle speed $V_R$ obtained in the vehicle speed presuming section 16 and the driven wheel speed $V_W$, and further decides whether or not the traction control should be executed, according to a procedure shown in FIG. 2 and on the basis of the results of such decisions and signals received from the brake switch 14 and the parking switch 15, thereby providing the traction control only when the traction control is possible.

Referring to FIG. 2, the amount of change A of vehicle speed is calculated at a first step S1. The vehicle speed change amount A is obtained by subtracting the present driven wheel speed $V_{W(n)}$ from the previous vehicle speed $V_{R(n-1)}$ obtained in the vehicle speed presuming section 16. At the next step S2, it is decided whether or not the elapsed time t (when $A \leq \Delta V_{R-}$) is less than or equal to given time T1, i.e., whether or not the duration in a speed-reduced state where the amount A of vehicle speed changed is equal to or less than a preset deceleration $\Delta V_{R-}$ is equal to or less than the given time T1. The preset deceleration is set in correspondence to the smallest deceleration on a road surface of the lowest frictional coefficient which can be usually supposed and for example, is set at about $-0.2$ G. The given time T1 is set in correspondence to the time required to decide the speed-reduced state, and for example, is set at 100 msec.

If it is decided at the second step S2 that the elapsed time t (when $A \leq \Delta V_{R-}$) is less than or equal to the given time T1, the process moves to the third step S3 where it is decided whether or not the brake switch 14 has produced a low level signal, i.e., whether or not the brake switch 14 has produced a low level signal, i.e., whether or not the brake is inoperative. If inoperative (i.e., YES), it is decided at a fourth step S4 whether or not the parking switch 15 has produced a low level signal, i.e., whether or not the parking brake is inoperative. If inoperative (i.e., YES), the traction control is executed as necessary at a fifth step S5.

If it is decided at the second step S2 that the elapsed time t (when $A \leq \Delta V_{R-}$) exceeds the given time T1, the process continues to a sixth step S6 and at the sixth step S6, the traction control is inhibited. Further, if it is decided at the third step S3 that the brake is operative, the process continues to a seventh step S7 and at the seventh step S7, it is decided whether or not the vehicle speed $V_R$ is lower than a preset speed $V_{RO}$. For example, the present speed $V_{RO}$ is set at 15 km/hr. If the vehicle speed $V_R$ is less than 15 km/hr., a step is taken to an eighth step S8. If the vehicle speed $V_R$ is greater than or equal to 15 km/hr., a step is taken to the sixth step S6.

At the eight step S8, it is decided whether or not the brake is operative from before starting of the traction control. If it is decided that the brake is operative from before starting of the traction control (i.e., if YES), the process continues to the fourth step S4. If NO, the process continues to the sixth step S6. If it is decided at the fourth step S4 that the parking brake is operative, the process continues to the sixth step S6.

The operation of this embodiment will be described below. When the elapsed time t (representative of the state when $A \leqq \Delta V_{R-}$) is sustained for the given time T1 or more, the driving-torque suppression control is inhibited on the basis of the decision that the vehicle is being reduced in speed. This prevents the driving torque from being unnecessarily suppressed to reduce the speed-increasing and braking performances.

Moreover, if the duration of time t does not exceed the given time T1, the traction control can be executed when the brake is inoperative, so that when the slipping tendency of the driving wheel is increased, the driving torque can be suppressed to reduce such slipping tendency, thereby providing the recovery of the driving force.

In a braking condition where the duration of time t is less than or equal to the given time T1, the execution of the traction control is inhibited except for the cases where the vehicle speed $V_R$ exceeds the preset speed $V_{RO}$ and where the brake is operative from before starting of the traction control, thereby sufficiently incurring the braking performance by a braking operation.

Further, if the parking switch 15 is ON, the execution of the traction control is inhibited, thereby ensuring that the traction control can be prevented from being inadvertently executed in a condition where the driven wheel speed $V_W$ cannot be accurately detected.

Because it is decided at the second step S2 shown in FIG. 2 whether or not the time t is less than or equal to the given time T1, it is ensured that even if both the brake switch 14 and the parking switch 15 have any trouble in their OFF states, the traction control can be inhibited when the brakes associated with these switches 14 and 15 are operative. Therefore, it is possible to cope with the trouble of the brake switch 14 and the parking switch 15 in their OFF states.

In an alternate embodiment of the present invention, the sensitivity of the traction control may be reduced in place of inhibiting the execution of the traction control. Even if doing so, it is possible to avoid an excessive traction control to prevent reductions in driving and braking performances.

In addition, although the braking force is applied to the driving wheels to suppress the driving torque in the above-described embodiment, it will be understood that the engine output providing the driving force to the driving wheels may be reduced to suppress the driving torque.

We claim:

1. A method for traction control of a vehicle, comprising the steps of:
   detecting a slipping tendency of a driving wheel in a driving state;
   suppressing driving torque of the driving wheel;
   determining that the vehicle is being reduced in speed; and
   controlling a suppression of driving torque of the driving wheel in accordance with the slipping tendency of the driving wheel, such that, when the vehicle is being reduced in speed, the control of the suppression of driving torque is inhibited to prevent subsequent reduction of driving wheel speed increases,
   wherein the inhibition of the suppression control of the driving torque is removed when the travel speed of the vehicle is less than a predetermined speed.

2. The method of claim 1, including the step of determining that the vehicle is being reduced in speed by a signal produced from a brake switch which detects a brake operation.

3. The method of claim 1 or 2, wherein the inhibition of the suppression control of the driving torque is removed when a signal indicative of the brake being operative before start of traction control is produced from the brake switch.

4. The method of claim 1 or 2, including the step of determining that the vehicle is being reduced in speed by a comparison of a vehicle speed presumed on a basis of a last detected driven wheel speed with a presently detected driven wheel speed.

5. The method of claim 4, wherein the suppression control of driving torque is inhibited when a parking brake is operative.

6. The method of claim 1, wherein the inhibition of the suppression control of the driving torque is removed when a signal indicative of the brake being operative before start of traction control is produced from the brake switch.

7. The method of claim 1, including the step of determining that the vehicle is being reduced in speed by a comparison of a vehicle speed presumed on a basis of a last detected driven wheel speed with a presently detected driven wheel speed.

8. The method of claim 3, including the step of determining that the vehicle is being reduced in speed by a comparison of a vehicle speed presumed on a basis of a last detected driven wheel speed with a presently detected driven wheel speed.

9. A method for traction control of a vehicle, comprising the steps of:
   detecting a driving wheel speed of a driving wheel;
   detecting a plurality of driven wheel speeds;
   determining a vehicle speed based on said driven wheel speeds;
   detecting slipping tendency of a driving wheel by comparing the driving wheel speed with the vehicle speed;
   suppressing driving torque of said driving wheel;
   determining that the vehicle is being reduced in speed by comparing an amount of variation in the vehicle speed with a preset deceleration; and
   controlling a suppression of driving torque of the driving wheel, such that, when the vehicle is being reduced in speed, the control of the suppression of driving torque is inhibited to prevent subsequent reduction of driving wheel speed increases.

10. A method for traction control of a vehicle according to claim 9, wherein said amount of variation in the vehicle speed is a difference between a last detected vehicle speed and a presently detected driven wheel speed.

11. A method for traction control of a vehicle according to claim 9, wherein the step of determining that the vehicle is being reduced in speed is made when a predetermined time has elapsed in which the amount of variation in the vehicle speed is equal to or less than the preset deceleration.

12. A method for traction control of a vehicle according to claim 9, wherein said preset deceleration is set at a value corresponding to a minimum deceleration on a road surface having a low coefficient of friction.

* * * * *